United States Patent
Yoon

(10) Patent No.: US 10,617,254 B2
(45) Date of Patent: Apr. 14, 2020

(54) HAND DRIP COFFEE TUMBLER

(71) Applicant: Han Sang Yoon, Seoul (KR)

(72) Inventor: Han Sang Yoon, Seoul (KR)

( * ) Notice: Subject to any disclaimer, the term of this patent is extended or adjusted under 35 U.S.C. 154(b) by 914 days.

(21) Appl. No.: 15/024,528

(22) PCT Filed: Nov. 7, 2013

(86) PCT No.: PCT/KR2013/010053
§ 371 (c)(1),
(2) Date: Mar. 24, 2016

(87) PCT Pub. No.: WO2015/064811
PCT Pub. Date: May 7, 2015

(65) Prior Publication Data
US 2016/0227959 A1    Aug. 11, 2016

(30) Foreign Application Priority Data
Oct. 30, 2013   (KR) .................. 10-2013-0129868

(51) Int. Cl.
*A47J 31/42*    (2006.01)
*A47J 31/00*    (2006.01)
*A47J 31/44*    (2006.01)
*A47J 31/06*    (2006.01)
*A47J 31/10*    (2006.01)

(52) U.S. Cl.
CPC ............. *A47J 31/42* (2013.01); *A47J 31/005* (2013.01); *A47J 31/06* (2013.01); *A47J 31/10* (2013.01); *A47J 31/44* (2013.01)

(58) Field of Classification Search
CPC .. A47J 31/42; A47J 42/00; A47J 43/04; A47J 44/00; A47J 42/04; A47J 42/34; A47J 42/24; A47J 42/14
USPC ........................................................... 99/279
See application file for complete search history.

(56) References Cited

U.S. PATENT DOCUMENTS

| | | | | | |
|---|---|---|---|---|---|
| 2,703,030 | A | * | 3/1955 | Hayes | B25B 13/463 81/57.29 |
| 4,230,238 | A | * | 10/1980 | Wilson | G01F 19/00 141/98 |
| 5,108,016 | A | * | 4/1992 | Waring | B01F 15/04 220/219 |
| 5,363,745 | A | * | 11/1994 | Lin | A47G 19/14 220/230 |

(Continued)

FOREIGN PATENT DOCUMENTS

| | | |
|---|---|---|
| JP | 11178718 | 7/1999 |
| KR | 20060108043 | 10/2006 |

(Continued)

OTHER PUBLICATIONS

International Search Report—PCT/KR2013/010053 dated Jul. 28, 2014.

*Primary Examiner* — Serkan Akar
*Assistant Examiner* — Spencer H. Kirkwood
(74) *Attorney, Agent, or Firm* — Cantor Colburn LLP

(57) ABSTRACT

A hand drip coffee tumbler comprises: a container keeping coffee; a filter unit seated on the top of the container; a grinder unit separably coupled to the container over the filter unit to grind coffee beans; a cap separably coupled to the top of the container; and an auxiliary container having a space for keeping the grinder unit and separably coupled to the lower end portion of the container.

11 Claims, 10 Drawing Sheets

(56) References Cited

U.S. PATENT DOCUMENTS

| | | | | |
|---|---|---|---|---|
| 6,375,382 | B1* | 4/2002 | Clavet | E05F 11/16 16/429 |
| 6,409,038 | B1* | 6/2002 | Karp | A47G 19/2205 215/395 |
| 7,992,487 | B1* | 8/2011 | Kahl | A47J 36/14 220/592.16 |
| 8,360,396 | B2* | 1/2013 | Robledo | B66F 3/16 254/1 |
| 2002/0036176 | A1* | 3/2002 | Hughes | B01D 35/02 210/767 |
| 2006/0076442 | A1* | 4/2006 | Fouse | A47J 42/34 241/169.1 |
| 2006/0107839 | A1 | 5/2006 | Nenov et al. | |
| 2007/0137495 | A1* | 6/2007 | Talbert | A47J 31/20 99/286 |

FOREIGN PATENT DOCUMENTS

| | | |
|---|---|---|
| KR | 20080085494 | 8/2008 |
| KR | 2020090000673 | 1/2009 |
| KR | 20100026476 | 3/2010 |
| KR | 20110064723 | 6/2011 |
| WO | 2004023956 | 3/2004 |

* cited by examiner

HAND DRIP COFFEE TUMBLER

TECHNICAL FIELD

The present invention relates to a hand drip coffee tumbler and, more particularly, to a hand drip coffee tumbler including a filter and a grinder for making hand drip coffee so that a user can easily make and drink drip coffee outdoors other than at home or office.

BACKGROUND ART

Recently, drip coffee has been popularized instead of instant coffee due to the flavor and high quality, and accordingly, specialty stores for drip coffee and devotees of drip coffee have been increased.

Further, users who want to have drip coffee at home or office can have drip coffee by grinding coffee beans using a specific grinder and extracting liquid of coffee using a filter, or can purchase a specific espresso coffee machine and make drip coffee with the machine.

However, it is possible to have drip coffee at a place with the grinder and the filter, or the espresso coffee machine even without using a specialty store for drip coffee, but it is impossible to have drip coffee at a place without the grinder and the filter, or the espresso coffee machine unless using a specialty store for drip coffee.

That is, it is possible to simply have instant coffee on a journey or outdoors as long as a user has instant coffee, a cup, and hot water, but a grinder and a filter, or an espresso coffee machine that is relatively large in volume is required to have drip coffee in comparison to instant coffee, so it is very difficult and troublesome to have drip coffee on a journey or outdoors.

Accordingly, small grinders and filters are recently used for the lovers of drip coffee to easily carry, but common users have a trouble of preparing and carrying those grinders and filters, and a coffee cup and a thermos bottle for hot water. Further, the flavor and the aroma of drip coffee are lost while liquid coffee made through a grinder and a filter is put into a coffee cup.

Further, the espresso coffee machines on the market are expensive and have difficulty in adjusting the concentration of drip coffee in accordance with users' tastes.

In relation to the present invention, there is Korean Utility Model Application Publication No. 20-2009-000673, titled "A tumbler with filter net container".

DISCLOSURE

Technical Problem

An object of the present invention is to provide a hand drip coffee tumbler that is very convenient to carry by having all parts for making drip coffee in an 'all-in-one' structure.

Technical Solution

A hand drip coffee tumbler according to the present invention may include: a container keeping dripped coffee; a filter unit seated at the top of the container; a grinder unit disposed over the filter unit and separably coupled to the container to grind coffee beans; and a cap separably coupled to the container with the grinder unit therein.

The outer side of the lower end of the grinder unit may be coupled to the inner side of the upper end of the container, and the inner side of the lower end of the cap may be coupled to the outer side of the upper end of the container.

The grinder unit may include: a housing with open top and bottom; a rotary shaft vertically extending at the center of the housing; a male grinder coupled to the lower end of the rotary shaft in the housing and rotated by the rotary shaft; and a female grinder surrounding the male grinder in the housing and fixed to the housing.

The grinder unit may further include a rotary lever coupled to the upper end of the rotary shaft to rotate the rotary shaft.

The rotary lever may include: a coupling link having an end coupled to the upper end of the rotary shaft; and a pivot link coupled to the coupling link by a hinge at the other end of the coupling link to be folded into the housing or unfolded outside the housing.

A hole where the rotary shaft is inserted may be formed at the pivot link so that the rotary shaft does not interfere with pivot link when the pivot link is folded into the housing.

When the pivot link is unfolded outside the housing, an end of the pivot link may be in surface contact with the bottom of the other end of the coupling link through an inclined surface.

The rotary lever may have a foldable structure composed of at least two or more links, and the links may be curved and folded in a circular shape.

The grinder unit may further include a top cover for covering the open top of the housing.

A stepped portion for supporting the filter unit may be formed on the inner side of the upper portion of the container.

The filter unit may include: a rim supported in contact with the stepped portion; a mesh formed in a conical shape under the rim; and handles protruding to a side on the rim.

The mesh may be made of metal.

The cap may be used to keep hot water and pour the hot water into the container through the filter unit keeping ground coffee beans.

A discharge hole for discharging hot water may be formed through the side of the cap.

The discharge hole may be formed at an angle through the side of the cap.

A hand drip coffee tumbler according to the present invention may include: a container keeping coffee; a filter unit seated on the top of the container; a grinder unit separably coupled to the container over the filter unit to grind coffee beans; a cap separably coupled to the top of the container; and an auxiliary container having a space for keeping the grinder unit and separably coupled to the lower end portion of the container.

The auxiliary container may be used to keep hot water and pour the hot water into the container through the filter unit keeping ground coffee beans.

A discharge hole for discharging hot water may be formed through the side of the auxiliary container.

The discharge hole is formed at an angle through the side of the auxiliary container.

Advantageous Effects

The present invention provides a hand drip coffee tumbler that includes a grinder unit for grinding coffee beans and a filter unit for filtering ground coffee beans in a common tumbler having a container and a cap, in which the container, filter unit, grinder unit, and cap can be integrated, that is, all parts for making drip coffee are integrated in an 'all-in-one' structure; therefore, the present invention is characterized by improving convenience for a user to carry a tumbler.

Accordingly, since a user can simply carry the hand drip coffee tumbler of the present invention, which is a device for making drip coffee, the user can conveniently make and have drip coffee in person without a limit of place.

BEST MODE

Advantages and features of the present invention and methods for achieving them will become apparent from the descriptions of exemplary embodiments herein below with reference to the accompanying drawings.

However, the present invention is not limited to exemplary embodiments disclosed herein but may be implemented in various different forms. The exemplary embodiments are provided for making the disclosure of the present invention thorough and for fully conveying the scope of the present invention to those skilled in the art. It is to be noted that the scope of the present invention is defined only by the claims.

A hand drip coffee tumbler according to an embodiment of the present invention is described hereafter in detail with reference to FIGS. 1 to 9. Well-known function or configuration will not be described in detail in the following description in order not to make the spirit of the present invention unclear.

Figure 1:
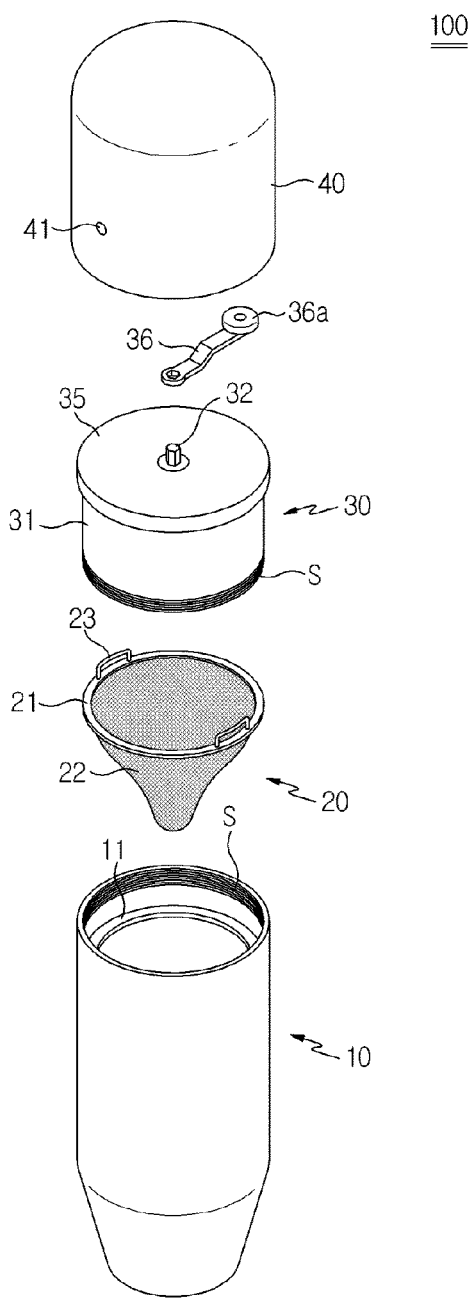
FIG. 1 is an exploded perspective view of a hand drip coffee tumbler according to an embodiment of the present invention.
Figure 2:
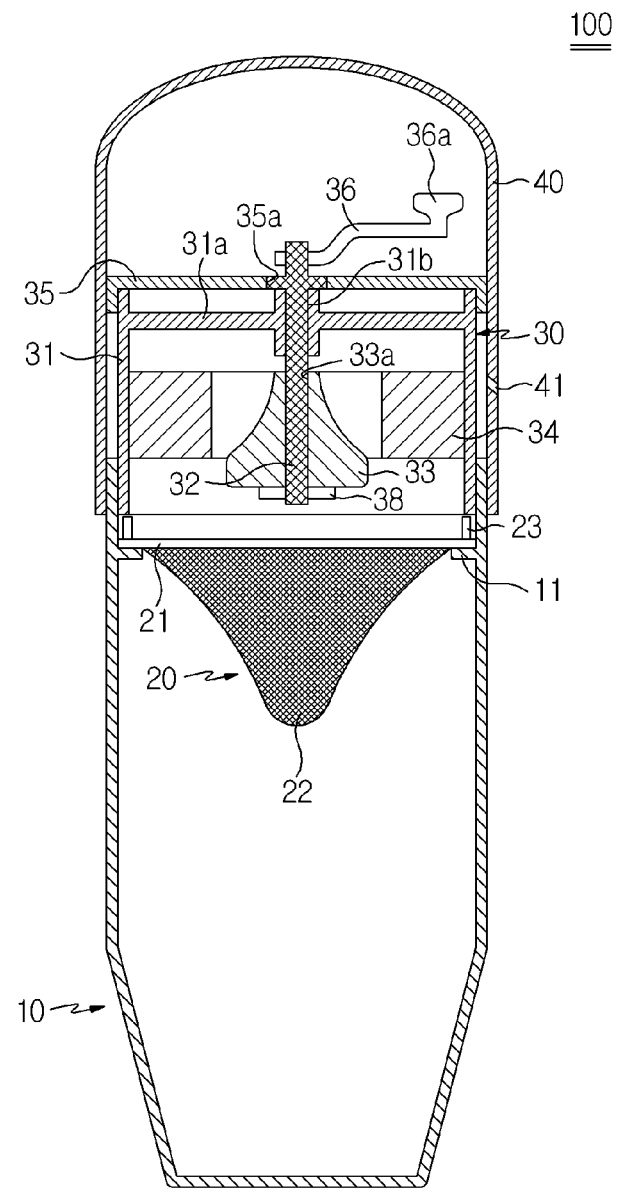
FIG. 2 is a cross-sectional view of the assembly of the hand drip coffee tumbler illustrated in FIG. 1.

FIG. 1 is an exploded perspective view of a hand drip coffee tumbler according to an embodiment of the present invention and FIG. 2 is a cross-sectional view of the assembly of the hand drip coffee tumbler illustrated in FIG. 1.

A hand drip coffee tumbler 100 of the present invention includes a grinder unit 30 for grinding coffee beans and a filter unit 20 for filtering ground coffee beans in a common tumbler having a container for keeping liquid (coffee) and a cap for covering the top of the container, in which, as illustrated in FIGS. 1 and 2, the container 10, filter unit 20, grinder unit 30, and cap 40 are integrated, that is, all parts for making drip coffee are integrated in an 'all-in-one' structure. Accordingly, the present invention is characterized by improving convenience for a user to carry a tumbler.

To this end, the hand drip coffee tumbler 100 according to an embodiment of the present invention, as illustrated in FIGS. 1 and 2, includes a container 10 for keeping dripped coffee, a filter unit 20 seated on the top of the container 10, a grinder unit 30 disposed on the filter 20 and separably coupled to the container 10 to grind coffee beans, and a cap 40 separably coupled to the container 10 with the grinder unit 30 therein.

Referring to FIGS. 1 and 2, the container 10 keeps coffee that is dripped when hot water is poured through the filter unit 20 seated in the container 10 with coffee beans ground by the grinder unit 30. In this case, a stepped portion 11 for supporting the filter unit 20 is formed around the inner side at the upper portion of the container 10, as illustrated in FIGS. 1 and 2. Referring to FIGS. 1 and 2, the stepped portion 11 extends around the inner side of the upper portion of the container 10 and protrudes toward the rotational center of the container 10, but the present invention is not limited to the stepped portion 11 and a plurality of stepped portions may protrude toward the rotational center of the container 10 with regular intervals at portions of the inner side of the container 10.

Referring to FIGS. 1 and 2, the filter unit 20 has a rim 21 having a ring shape where the top and bottom of the stepped portion 11 of the container 10 are in contact, a mesh 22 formed in a conical shape under the rim 21, and handles 23 protruding to a side on the rim 21. The filter unit 20 having this configuration filters the coffee beans ground by the grinder unit 30, and as illustrated in FIG. 2, and is supported on the stepped portion 11 in the container 10. The mesh 22 may be a metallic mesh or a filter made of paper, so-called a filter paper. The handles 23 are parts that a user holds to put or separate the rim 21 onto or from the stepped portion 11 of the container 10. Although the handles 23 protrude upward on the rim 21 in this embodiment, as illustrated in the figures, the present invention is not limited thereto and the handles 23 may protrude toward the rotational center of the rim 21 on the inner side of the rim 21.

Referring to FIGS. 1 and 2, the grinder unit 30 includes a housing 31 into which coffee beans are put, a rotary shaft 32 vertically extending at the center of the housing 31, a male grinder 33 coupled to the lower end of the rotary shaft 32 in the housing 31 and rotated by the rotary shaft 32, a female grinder 34 surrounding the male grinder 33 in the housing 31 and fixed to the housing 31, and a rotary lever 360 coupled to the upper end of the rotary shaft 320 to rotate the rotary shaft 320. Further, the grinder unit 30 further includes a top cover 35 for covering the top of the housing 31.

The housing 31 of the grinder unit 30 has an open top for putting in coffee beans and an open bottom for discharging the ground coffee beans to the filter unit 20. A supporting portion 31a having a shaft hole 31b where the rotary shaft 32 is inserted is disposed in the housing 31. A plurality of supporting portions 31a may protrude toward the rotational center of the housing 31 at portions of the inner side of the housing 31. The lower portion of the housing 31 and the upper portion of the container 10 are separably coupled to each other, and in this embodiment, a thread S is formed on the outer side of the lower end of the housing 31 and on the inner side of the upper end of the container 10 to correspond to each other for thread-fastening, so the lower end of the housing 31 and the inner side of the upper end of the container 10 are separably coupled to each other.

In the grinder unit, the male grinder 33 is disposed at a predetermined distance under the female grinder 34 and rotated by the rotary shaft 32. A rotary shaft hole 33a where the rotary shaft 32 is inserted is formed at the center of the male grinder 33. Further, grinding saw teeth (not illustrated) that can grind coffee beans put into the housing 31 are formed on the outer side of the male grinder 33 and the inner side of the female grinder 34. Meanwhile, a clamp 38 that adjusts the gap between the male grinder 32 and the female grinder 34 by adjusting the height of the male grinder 33 is disposed at the lower end of the rotary shaft of the grinder unit 30.

The top cover 35 of the grinder unit 30, as illustrated in FIG. 2, has a U-shaped cross-section and is disposed on the top of the housing 31 to cover the open top of the housing 31. In this case, a hole 35a through which the rotary shaft 32 inserted is formed at the center of the top cover 35. The top cover 35 prevents the coffee beans ground in the housing 31 from flying outside through the open top of the housing 31.

The rotary lever 36 of the grinder unit 30 is fixed at an end to the upper end of the rotary shaft protruding upward through the housing 31 and rotates the rotary shaft 32. In this case, a grip 36a is formed at the other end of the rotary lever 36 for a user to conveniently rotate the rotary lever 36. For reference, the rotary lever 36 preferably has a length and a size to be kept inside the cap 40 when the cap 40 is coupled to the top of the container 10.

Figure 3:
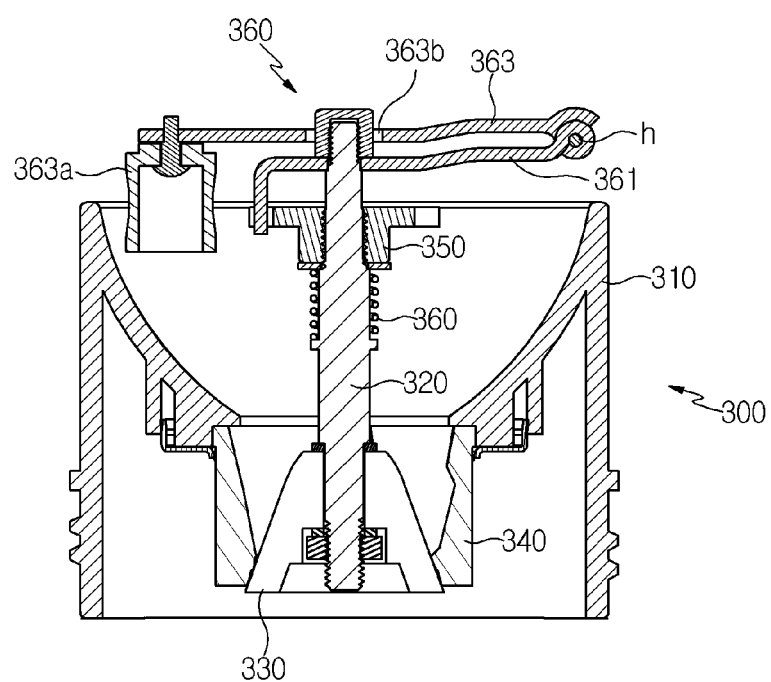
FIG. 3 is a cross-sectional view of grinder unit according to another embodiment of the present invention.
Figure 4:
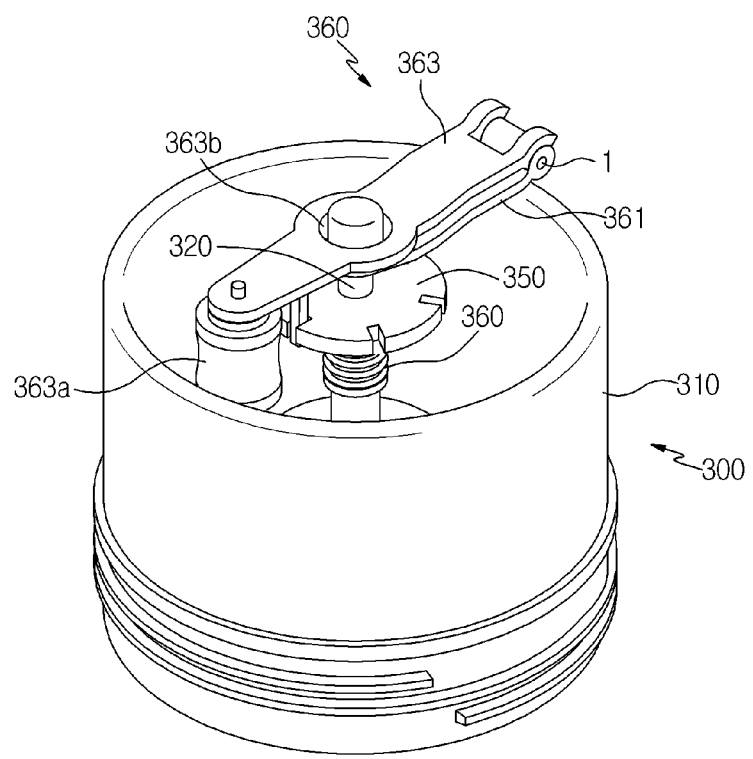
FIG. 4 is a perspective view of the grinder unit illustrated in FIG. 3.
Figure 5:
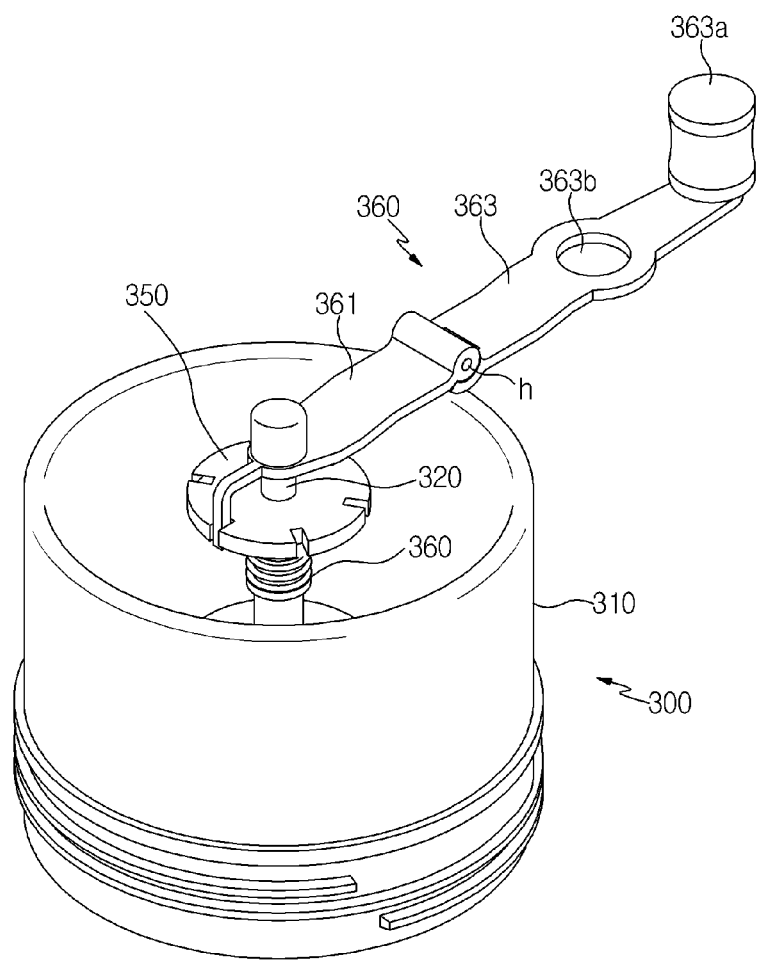
FIG. 5 is a perspective view of the grinder unit illustrated in FIG. 4 with a rotary lever unfolded.
Figure 6:
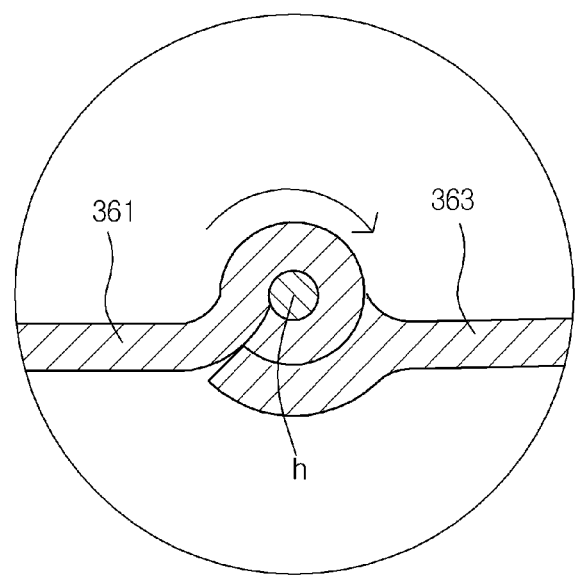
FIG. 6 is a cross-sectional view illustrating a coupling portion of a pivot link and a coupling link of the rotary lever of the grinder unit illustrated in FIG. 5.

FIG. 3 is a cross-sectional view of grinder unit according to another embodiment of the present invention, FIG. 4 is a perspective view of the grinder unit illustrated in FIG. 3, FIG. 5 is a perspective view of the grinder unit illustrated in FIG. 4 with a rotary lever unfolded, and FIG. 6 is a cross-sectional view illustrating a coupling portion of a pivot link and a coupling link of the rotary lever of the grinder unit illustrated in FIG. 5.

Referring to FIGS. 3 to 6, a grinder unit 30 according to another embodiment of the present invention includes: a housing 310 having an open top for putting in coffee beans, a rotary shaft 320 vertically extending at the center of the housing 310, a male grinder 330 disposed in the housing 310 and coupled to the lower end of the rotary shaft 320 to be rotated by the rotary shaft 320, a female grinder 340 surrounding the male grinder 330 in the housing 310 and fixed to the housing 310, and a rotary lever 360 coupled to the upper end of the rotary shaft 320 and rotating the rotary shaft 320.

Further, the grinder unit 300 further includes a clamp 350 coupled to the upper portion of the rotary shaft 320 to adjust the gap between the male grinder 330 and the female grinder 340 and a compression spring 370 fitted on the rotary shaft 320 under the clamp 350 and absorbing shock applied to the male grinder 330 when the male grinder 330 and the female grinder 340 grind coffee beans.

The rotary lever 360 of the grinder unit 300 has a vertical foldable structure, and as illustrated in FIGS. 3 to 5, includes a coupling link 361 having an end coupled to the upper end of the rotary shaft 320, and a pivot link 363 coupled to the coupling link 361 by a hinge h at the other end of the coupling link 361 to be folded into the housing 310 or unfolded outside the housing 310.

The pivot link 363 can pivot at 180° at the other end of the coupling link 361 by the hinge h, so in order to rotate the rotary shaft 320 to grind coffee beans, a user can unfolds the pivot link 363 after pivoting at 180° outside the housing 31, 310, as illustrated in FIG. 5, and then holds the grip 363a at the other end of the pivot link 363 and rotates the pivot link 363 to grind the coffee beans. In contrast, after grinding the coffee beans, as illustrated in FIG. 4, the user folds the pivot link 363 into the housing 310 to keep the pivot link 363 inside the housing 310. Accordingly, when the cap 40 is coupled to the top of the container 10, the entire rotary lever 360 can be kept inside the cap 40. In this case, a hole 363b where the rotary shaft 320 is inserted is formed at the pivot link 363 so that the rotary shaft 320 does not interfere with pivot link 363 when the pivot link 363 is folded into the housing 310. Alternatively, it may be possible to form a curved portion (not illustrated) at the middle portion of the pivot link 363 instead of the hole 363b such that the rotary lever 360 can be folded without interference by the rotary shaft 320.

When the pivot link 363 is unfolded outside the housing 310, an end of the pivot link 363 is in surface contact with the bottom of the other end of the coupling link 361 through an inclined surface and presses the other end of the coupling link 361 in the inclination direction. According to this configuration, it is possible to prevent the other end of the coupling link 361 from being broken or damaged by force transmitted through an end of the pivot link 363 when a user pivots the pivot link 363, and this is because an end of the pivot link 363 is coupled to the other end of the coupling link 361 through the inclined surface and accordingly the force applied to the other end of the coupling link 361 can be distributed vertically and horizontally.

Figure 7:
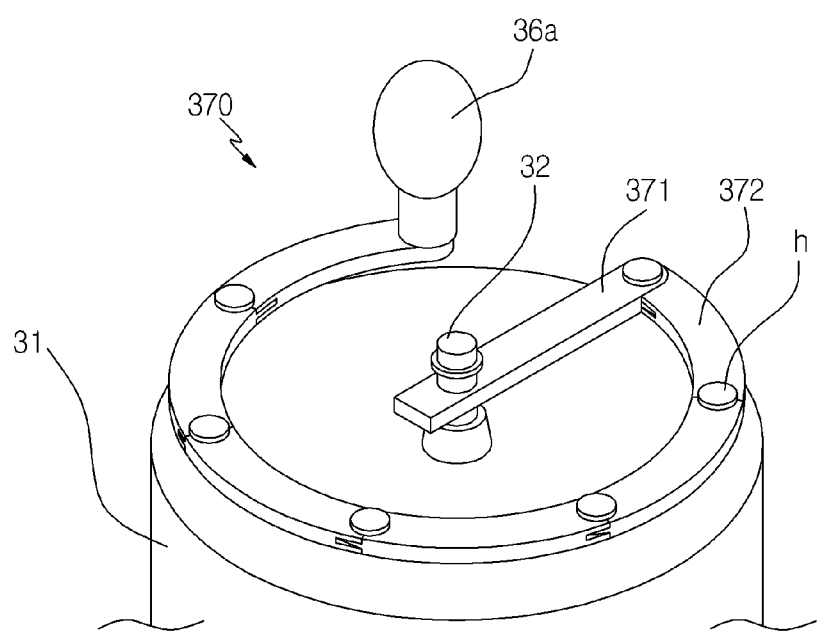
FIG. 7 is a partial perspective view of a grinder unit for illustrating a modification of the rotary lever of the grinder unit of the hand drip coffee tumbler illustrated in FIG. 1.
Figure 8:
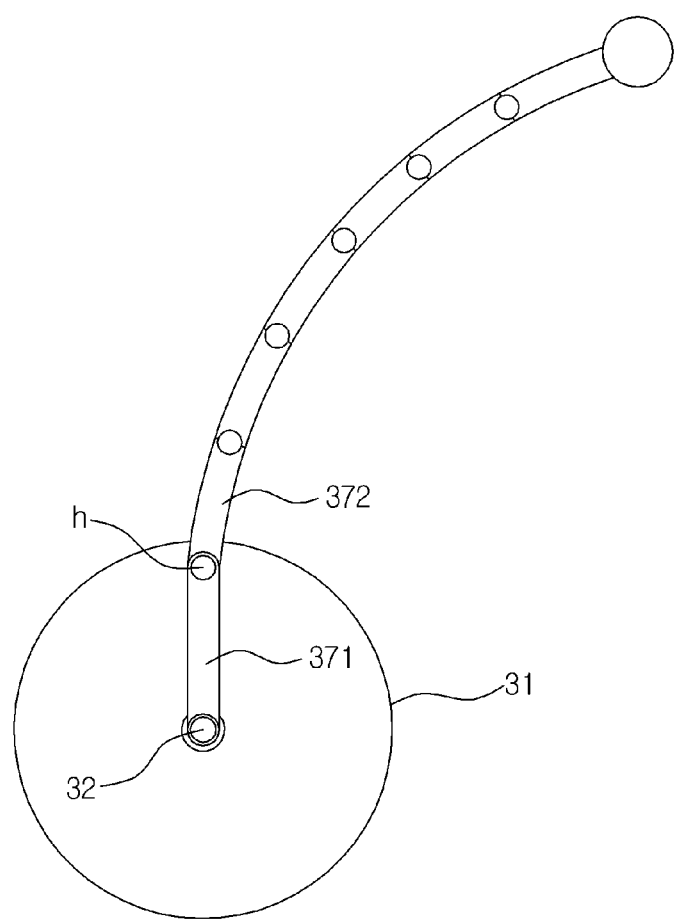
FIG. 8 is a plan view of the grinder unit illustrated in FIG. 7 with a rotary lever unfolded.

FIG. 7 is a partial perspective view of a grinder unit for illustrating a modification of the rotary lever of the grinder unit of the hand drip coffee tumbler illustrated in FIG. 1 and FIG. 8 is a plan view of the grinder unit illustrated in FIG. 7 with a rotary lever unfolded.

Referring to FIGS. 7 and 8, a rotary lever 370 is composed of a plurality of links 371 and 372 connected by hinges h in a horizontal foldable structure. The links 371 and 372 are a coupling link 371 with an end coupled to the upper end of the rotary shaft 32 and a plurality of pivot links 372 connected to the other ends of the coupling link 371 and curved or having an arc shape. Accordingly, the links 371 and 372 are disposed in a circular shape inside the housing 31, as illustrated in FIG. 7, and a user can stretch the plurality of pivot links 372 outside the housing 31, as illustrated in FIG. 8, when rotating the rotary shaft 32 to grind coffee beans.

The rotary lever 360 illustrated in FIGS. 4 and 5 and the rotary lever 370 illustrated in FIGS. 7 and 8 have a vertical foldable structure or a horizontal foldable structure, so they can kept inside the housings 31 and 310 of the grinder unit 30 and 300 when they are not used, and when a user wants to grind coffee beans using the grinder units 30 and 300, they are stretched outside the housing 31 and 310 and rotated with a rotational radius larger than that of the rotary lever having a length and a size included inside the housings 31 and 310, so the user can quickly and conveniently grind coffee beans with a relatively small force.

Figure 9:
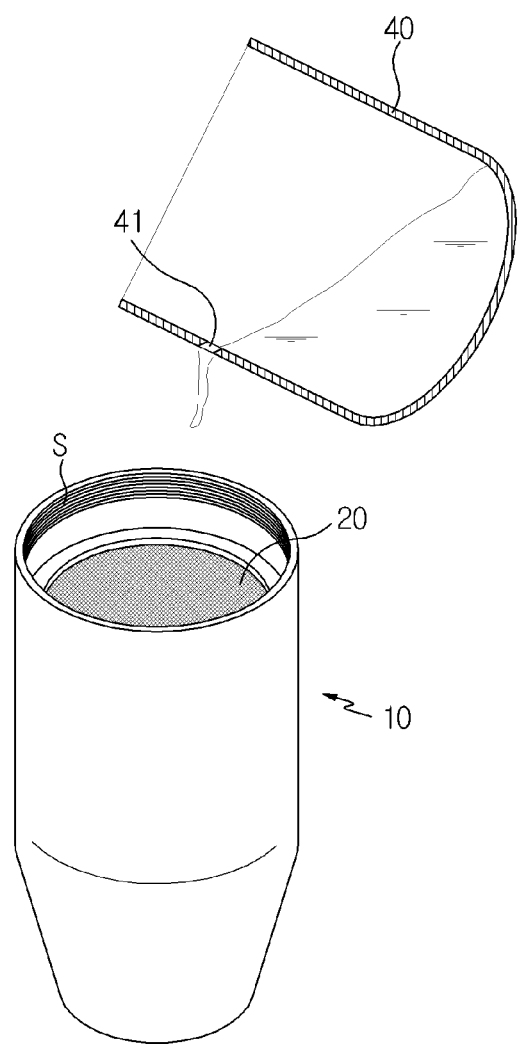
FIG. 9 is a perspective view illustrating a state when hot water in the cap of the hand drip coffee tumbler illustrated in FIG. 1 is poured into a container through a discharge hole at the cap.

FIG. 9 is a perspective view illustrating a state when hot water in the cap of the hand drip coffee tumbler illustrated in FIG. 1 is poured into a container through a discharge hole at the cap.

Referring to FIGS. 1, 2 and 9, the cap 40 is coupled to the container 10 combined with the filter unit 20 and the grinder unit 30. In this case, since the cap 40 is combined with the container 10 with the grinder unit 30 therein, it has an internal space enough for keeping the grinder unit 30 coupled to the top of the container 10. Meanwhile, as described above, since the inner side of the top of the container 10 is coupled to the outer side of the lower end of the grinder unit 30, it is preferable that the cap 40 has an inner diameter larger than the outer diameter of the container 10 and the inner side of the lower end is coupled to the outer side of the upper end of the container 10. In the present embodiment, a thread (not illustrated) is formed on the inner side of the lower end of the cap 40 and on the outer side of the upper end of the container 10 for thread-fastening, so the cap 40 and the container 10 are separably combined with each other. However, the way of combining the cap 40 and the container 10 is not limited thereto and various ways such as fitting well known in the art may be used.

Meanwhile, the cap 40, as illustrated in FIG. 9, is used to keep hot water and pour the hot water into the container 10 through the filter unit 20 keeping ground coffee beans. That is, the cap 40 functions as a kettle for pouring water into the container 10 other than a 'cap' covering the container 10 as its name. In this case, since it has a large influence on the flavor and aroma of coffee to adjust water to pour when making hand drip coffee, it is preferable to form a discharge hole 41 for discharging hot water in order to finely adjust water to be poured in a small amount, through the side of the cap. The discharge hole 41 is more preferably formed at an angle through the side of the cap 40, and in detail, it is formed downward from the inner side to the outer side through the side of the cap 40 when the opening of the cap 40 is positioned at the lower end. The discharge hole 41 is preferably formed through the side close to the opening of the cap 40 so that a sufficient amount of water can be kept in the cap 40.

An example of using the hand drip coffee tumbler according to an embodiment of the present invention having the configuration described above is described hereafter with reference to FIGS. 1, 2, and 9.

First, in order to drink drip coffee, a user separates the cap 40 from the top of the container 10.

Next, the user puts coffee beans into the housing 31 of the grinder unit 30. When the grinder unit 30 has the top cover 35, the user separates the top cover 35 from the top of the housing 31 and then puts the coffee beans into the housing 31.

Next, when the user rotates the rotary shaft 32 using the rotary lever 36, the coffee beans in the housing 31 is ground.

Next, when the coffee beans finish being grounded, the user separates the grinder unit 30 from the top of the container 10 and puts hot water into the cap 40.

Next, the user pours the hot water in the cap 40 down to the filter unit 20 through the discharge hole 41 formed at the cap 40.

Finally, the user separates the filter unit 20 from the container 10 and can drink the drip coffee in the container 10.

Hereinafter, a hand drip coffee tumbler according to another embodiment of the present invention is described in detail with reference to FIG. 10.

Figure 10:
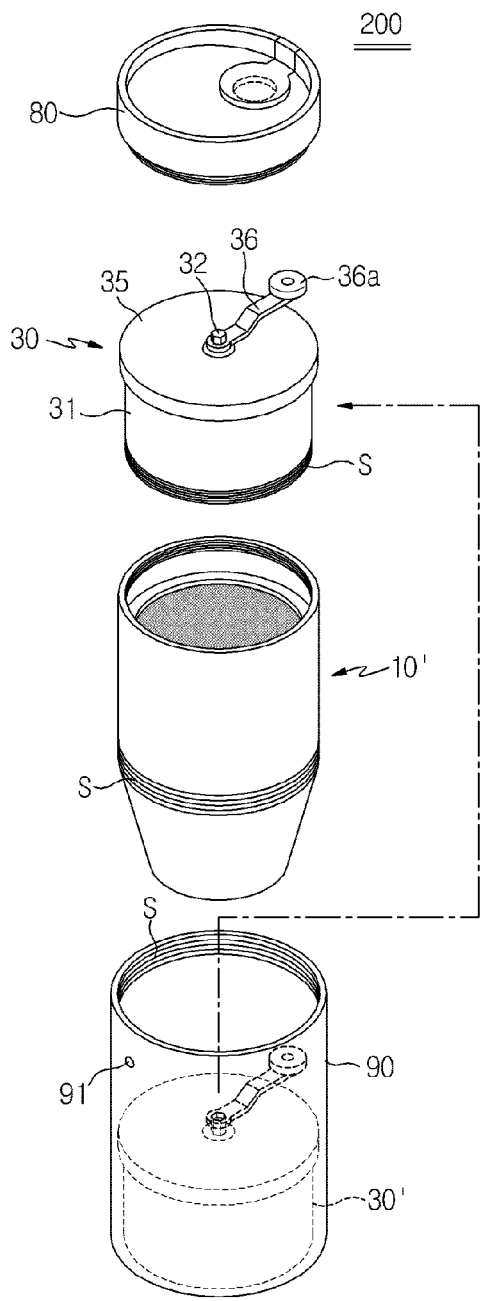
FIG. 10 is an exploded perspective view of a hand drip coffee tumbler according to another embodiment of the present invention.

A hand drip coffee tumbler 200 according to another embodiment of the present invention, as illustrated in FIG. 10, includes a container 10' for keeping dripped coffee, a filter unit (not illustrated and see FIG. 1) seated at the top of the container 10', a grinder unit 30' separably coupled to the container 10' over the filter unit to grind coffee beans, a cap 80 separably coupled to the top of the container 80', and an auxiliary container 90 having a space for keeping the grinder unit 30' and separably coupled to the lower portion of the container 10'.

For reference, the container 10', the filter unit (not illustrated), and the grinder unit 30' of the hand drip coffee tumbler 200 according to another embodiment of the present invention substantially have the same configurations as those of the container 10, the filter unit 20, and the grinder units 30 and 300 of the hand drip coffee tumbler 100 according to the previous embodiment, so the previous embodiment is referred for the detailed description.

The cap 80 has a shape and a size enough for covering the open top of the container 10', and in the present embodiment, the cap has a seat where the top of the container 10' can be inserted. In this case, a discharge hole for discharging liquid in the container may be formed through the top of the cap 80 and the discharge hole may be opened/closed by a specific member on the top of the cap 80.

The cap 80 and the container 10' may be combined by forcibly fitting the upper end of the container 10' into the seat of the cap 80, in which the cap 80 is preferably made of rubber or plastic having elasticity. Further, the way of combining the cap 80 and the container 10' is not limited to the forcible fitting and may be achieved by thread-fastening using threads described above. That is, it may be possible to thread-fasten the cap 80 and the container 10' to each other by forming a thread (not illustrated) on the inner side of the cap 80 and the outer side of the upper end of the cap 10'.

The auxiliary container 90, as illustrated in FIG. 10, has an internal space for keeping the grinder unit 30'. Further, the upper portion of the auxiliary container 90 and the lower portion of the container 10' are separably coupled to each other. In this case, the way of combining the auxiliary container 90 and container 10' may be achieved by various methods well known in the art such as thread-fastening or forcible fitting. For reference, in the present embodiment, a thread S is formed on the inner side of the upper end of the auxiliary container 40 and on the outer side of the lower end of the container 10' for thread-fastening, so the auxiliary container 90 and the container 10' are separably combined with each other. Accordingly, the auxiliary container 90 can provide a space where the grinder unit 30' is stowed, when the grinder unit 30' is not used. Meanwhile, other than the grinder unit 30', the filter unit (not illustrated) may be kept in the space of the auxiliary container 90.

Meanwhile, the auxiliary container 90 functions as a kettle when water is poured into the container 10', so a discharge hole 91 for discharging hot water may be formed through the side of the auxiliary container 90. In this case, it is preferable that the discharge hole 91 is formed upward from the inner side to the outer side through the side of the auxiliary container 40, when the opening of the auxiliary container 90 is positioned at the upper portion.

According to the hand drip coffee tumbler 200 having the configuration of another embodiment of the present invention, the grinder unit 30' kept in the auxiliary container 90 can be taken out of the auxiliary container 90 and combined with the container 10 for use when it is required to grind coffee beans, so, similar to the hand drip coffee tumbler 100 according to the previous embodiment, all components for making drip coffee are integrated in an 'all-in-one' structure and accordingly a user can conveniently carry the tumbler. Further, when a user drinks drip coffee, not only the grinder unit 30', but the filter unit (not illustrated) can be kept in the auxiliary container 90, so it is possible to prevent the grinder unit 30' and the filter unit 20' from being contaminated and to reduce the possibility of loss of them.

Although detailed embodiments of the present invention were described above, it should be understood that the present invention may be modified in various ways without departing from the scope of the present invention.

Therefore, the scope of the present invention should not be limited to the embodiments and should be defined by not only claims, but equivalents to claim.

INDUSTRIAL APPLICABILITY

The present invention can be sold to customers at a specialty store for drip coffee or a coffee machine store.

The invention claimed is:

1. A hand drip coffee tumbler comprising: a container keeping dripped coffee; a filter unit seated at a top of the container; a grinder unit disposed over the filter unit and separably coupled to the container to grind coffee beans; and a cap separably coupled to the container, wherein the grinder unit includes: a housing; a rotary shaft disposed in the housing; a male grinder coupled to the rotary shaft and rotated by rotating the rotary shaft; a female grinder surrounding the male grinder in the housing; and a rotary lever coupled to the rotary shaft to rotate the rotary shaft, and wherein the cap has an internal space for receiving the grinder unit and is separably coupled to the container with the grinder unit received in the internal space so that the rotary lever of the grinder unit is not exposed to outside of the cap, and wherein the rotary lever has a foldable structure composed of at least two or more links and the link are curved and folded in a circular shape.

2. The hand drip coffee tumbler of claim 1, wherein an outer side of a lower end of the grinder unit is coupled to an inner side of an upper end of the container, and
   an inner side of a lower end of the cap is coupled to an outer side of the upper end of the container.

3. The hand drip coffee tumbler of claim 1, wherein the rotary lever includes: a coupling link having one end coupled to an upper end of the rotary shaft; and
   a pivot link coupled by a hinge at the other end of the coupling link to be folded into the housing or unfolded outside the housing.

4. The hand drip coffee tumbler of claim 3, wherein a hole where the rotary shaft is inserted is formed at the pivot link so that the rotary shaft does not interfere with the pivot link when the pivot link is folded into the housing.

5. The hand drip coffee tumbler of claim 1, wherein the grinder unit further includes a top cover for covering an open top of the housing.

6. The hand drip coffee tumbler of claim 1, wherein a stepped portion for supporting the filter unit is formed on an inner side of an upper portion of the container.

7. The hand drip coffee tumbler of claim 6, wherein the filter unit includes:
   a rim supported in contact with the stepped portion;
   a mesh formed in a conical shape under the rim; and
   handles protruding to a side on the rim.

8. The hand drip coffee tumbler of claim 7, wherein the mesh is made of metal.

9. The hand drip coffee tumbler of claim 1, wherein the cap is used to keep hot water and pour the hot water into the container through the filter unit keeping ground coffee beans.

10. The hand drip coffee tumbler of claim 9, wherein a discharge hole for discharging the hot water is formed through a side of the cap.

11. The hand drip coffee tumbler of claim 10, wherein the discharge hole is formed at an angle through the side of the cap.

* * * * *